United States Patent
Tuulos et al.

(10) Patent No.: US 7,835,721 B2
(45) Date of Patent: Nov. 16, 2010

(54) MULTIPLE SECURITY LEVEL MOBILE TELECOMMUNICATIONS DEVICE SYSTEM AND METHOD

(75) Inventors: Martti Tuulos, Tampere (FI); Kari-Matti Varanki, Nokia (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/508,054

(22) PCT Filed: Mar. 27, 2002

(86) PCT No.: PCT/IB02/02045

§ 371 (c)(1),
(2), (4) Date: Sep. 17, 2004

(87) PCT Pub. No.: WO03/081932

PCT Pub. Date: Oct. 2, 2003

(65) Prior Publication Data

US 2005/0164675 A1 Jul. 28, 2005

(51) Int. Cl.
*H04M 1/66* (2006.01)
(52) U.S. Cl. ............... 455/410; 455/411; 455/414.1; 455/414.2; 455/414.3; 726/9; 726/27; 726/29; 726/30; 726/23; 726/19; 726/21
(58) Field of Classification Search ......... 455/410–411, 455/456.1–456.6, 41.2, 418; 340/539.13, 340/539.11; 726/21
See application file for complete search history.

(56) References Cited

U.S. PATENT DOCUMENTS

| | | | |
|---|---|---|---|
| 5,778,304 A * | 7/1998 | Grube et al. | 455/456.4 |
| 6,084,968 A | 7/2000 | Kennedy et al. | |
| 6,308,273 B1 | 10/2001 | Goertzel et al. | |
| 6,351,813 B1 * | 2/2002 | Mooney et al. | 713/185 |
| 6,556,819 B2 * | 4/2003 | Irvin | 455/410 |
| 6,879,838 B2 * | 4/2005 | Rankin et al. | 455/456.6 |
| 7,000,116 B2 * | 2/2006 | Bates et al. | 713/182 |
| 2002/0102990 A1 * | 8/2002 | Alberth et al. | 455/456 |
| 2003/0073448 A1 * | 4/2003 | Ozeki et al. | 455/456 |
| 2003/0217137 A1 * | 11/2003 | Roese et al. | 709/223 |

FOREIGN PATENT DOCUMENTS

| | | |
|---|---|---|
| DE | 44 09 379 C2 | 7/2000 |
| EP | 1 150 531 A2 | 10/2001 |
| JP | 7-284153 A | 10/1995 |

OTHER PUBLICATIONS

3GPP TS 23.271 V4.2.0, $3^{rd}$ Generation Partnership Project; Technical Specification Group Services and System Aspects; Functional Stage 2 Description of LCS (Release 4), Jun. 2001, 68 pgs.

* cited by examiner

*Primary Examiner*—Charles N Appiah
*Assistant Examiner*—Randy Peaches
(74) *Attorney, Agent, or Firm*—Harrington & Smith

(57) ABSTRACT

A method and apparatus for implementing at least first and second security levels in a mobile telecommunications device for use within a telecommunications network. The location of the mobile device is determined, and one of the first and second security levels is selected on the basis of that location. A security procedure is implemented within the mobile device on the basis of the selected security level.

32 Claims, 2 Drawing Sheets

MULTIPLE SECURITY LEVEL MOBILE TELECOMMUNICATIONS DEVICE SYSTEM AND METHOD

FIELD OF INVENTION

The present invention relates to mobile telecommunications device security, and, more particularly, to implementing multiple security levels in such a device.

The invention has been developed primarily for use with mobile telephones and communication devices for use with third generation (UMTS) networks and will be described primarily with reference to this application. However, it will be appreciated that the invention has application under many other standards and protocols.

BACKGROUND OF INVENTION

Mobile telecommunications systems are known. One such example is the public land line mobile network (PLMN), of which cellular communications networks are an example. Another example is a mobile communication system that is based, at least partially, on use of communication satellites.

As the penetration rate of mobile phones into the population has increased, the incidence of theft, with or without violence, of such devices has increased. Whilst theft of current generation devices is costly and inconvenient to owners, the increase in available services and associated costs as networks are developed into the next generation mean that the potential for losses to users, network and insurers is higher than is presently the case. This is particularly the case where mobile devices are able to access high cost services, or even capable of transferring cash value between bank accounts or various credit- or debit-based accounting systems.

One way to improve the security of mobile devices is to increase the amount of effort needed by the user to access services on the device. Many mobile handsets presently available, for example, can be configured to require a password to be input each time the device is to be used. Whilst this effectively prevents the device being used if it is stolen, entering, say, a personal identification number (PIN) or password each time a call is to be made is tedious for the user. In many cases, the user can disable this feature if it is known the phone is to be in safe environment, such as the user's home. However, changing the security status each time the user moves from a safe to an unsafe environment is also tedious. Moreover, if the user forgets to turn the security on, or if the device is stolen from the safe environment with the security disabled, there is nothing to stop the thief from accessing the services available via the phone.

In an unrelated aspect of mobile telecommunications, information regarding the geographical location of mobile devices can be ascertained for various purposes, such as accessing location-based services. For example, fairly accurate geographical location information can be obtained based on satellite-based GPS (Global Positioning System). More accurate location information can be obtained through differential GPS techniques.

Another possibility is to use a location service based on a cellular telecommunications system. In this approach, the cells or similar geographically limited radio access entities and associated controllers of the communication system are utilised in production of at least a rough estimate of the current location of the mobile user equipment. To improve the accuracy of the location information the communication system may be provided with specific location measurement units that provide more accurate data concerning the location of user equipment within the service area of the cellular system.

It is also possible to ascertain a geographical location when the mobile user equipment is located within the coverage area of a visited or "foreign" network. The visited network may be made capable of transmitting the location of the mobile user equipment back to the home network, e.g. to support services that are based on location information or for the purposes of routing and charging.

The location data may be processed in a specific location service entity that is implemented either within the cellular system or connected thereto. The location data may also be processed in the user equipment that is provided with appropriate processing capacity. The location service entity provided by the communication system may serve different clients via an appropriate interface.

The location information may be used for various purposes, such as for location of a mobile telephone that has made an emergency call, for locating vehicles or given mobile subscribers and so on.

An example of the provision of the location information by a PLMN is described in more detail $3^{rd}$ Generation Partnership Project (3GPP) technical specifications, see e.g. 3GPP TS 23.271 version 4.2.0, titled "Functional stage 2 description of LCS", June 2001.

It is an object of the present invention to improve the ease with which multiple levels of security can be implemented in a mobile device configured for use within a communications network.

SUMMARY OF INVENTION

In a first aspect, the present invention provides a method of implementing at least first and second security levels in a mobile telecommunications device for use within a telecommunications network, the method including the step of:
  determining a location of the mobile device;
  selecting one of the first and second security levels on the basis of the location; and
  implementing a security procedure within the mobile device on the basis of the selected security level.

In a second aspect, the present invention provides a mobile telecommunications device for use within a telecommunications network, the mobile device having at least first and second security levels and being configured to:
  determine its location;
  select one of the first and second security levels on the basis of the location; and
  implement a security procedure on the basis of the selected security level.

In a third aspect, the present invention provides a system for implementing at least first and second security levels in a mobile telecommunications device for use within a telecommunications network, the system including:
  location determination means for ascertaining a location of the mobile device;
  means for selecting one of the first and second security levels on the basis of the location; and
  means disposed within the mobile device for implementing a security procedure within the mobile device on the basis of the selected security level.

Preferably, the location is defined as an area.

In one form, wherein the location of the mobile device is determined by the telecommunications network 23. Alternatively, the location is determined by the mobile device. In that case, the location of the mobile device is determined by:

receiving a signal at the mobile device;

ascertaining whether the signal is indicative of the device being within a relatively safe area; and if the device is within a relatively safe are, implementing the relatively lower of the security levels within the mobile device.

Preferably, the location is used to generate a security level instruction, the security level instruction being sent to the mobile device for implementation.

In one embodiment, the location is defined in terms of a cell defined in the telecommunications network. In an alternative embodiment, the location is defined in terms of proximity to one or more base stations within the telecommunications network.

In a preferred embodiment, the signal is a relatively short-range signal compared to call or data signals transmitted and received between the mobile device and the network.

Preferably, the signal includes unique data identifying a transmitter from which it is transmitted, thereby enabling the mobile device to ascertain whether it is in a location defined by proximity to the transmitter.

In one embodiment, the location is determined by reference to one or more external location providing signals. Preferably, the external location providing signals are GPS signals, the mobile device being configured to ascertain its location based on the GPS signals.

In a preferred form of the invention, the device is configured to receive input from a user, the input being indicative of a geographical range to be defined in relation to the location. The determination of the security level to be implemented is then based on the geographical range and the location. Preferably, the geographical range is defined in terms of a radius of operation with respect to the location.

In the preferred embodiment, the first security level is higher than the second security level. Preferably, the first security level requires more frequent input of identification or security data by a user than the second security level, to prevent the mobile device entering a third security mode.

BRIEF DESCRIPTION OF DRAWINGS

A preferred embodiment of the invention will now be described, by way of example only, with reference to the accompanying drawings, in which.

DETAILED DESCRIPTION OF PREFERRED EMBODIMENTS

It should be appreciated that even though the exemplifying telecommunications network shown and described in more detail uses the terminology of the third generation (3G) UMTS (Universal Mobile Telecommunications System) public land mobile network (PLMN), the proposed solution can be used in any system providing mobile communications for users and some kind of location information service.

Examples of other telecommunications systems include, without limiting to these, standards such as the GSM (Global System for Mobile communications) or various GSM based systems (such as GPRS: General Packet Radio Service), AMPS (American Mobile Phone System) or DAMPS (Digital AMPS), IMT 2000 (International Mobile Telecommunications system 2000), i-phone and so on.

Figure 1:
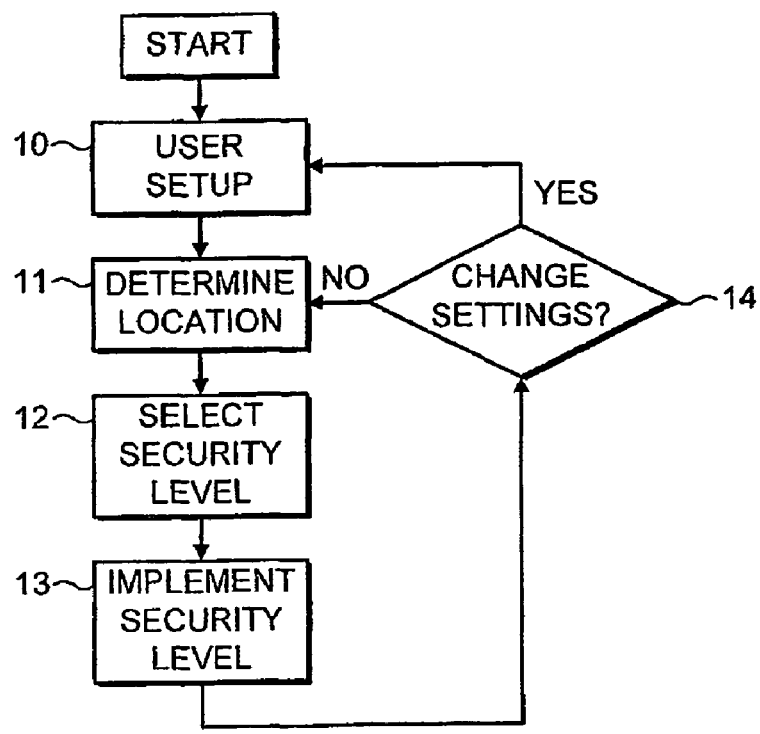
FIG. 1 is a flowchart showing steps involved in implementing multiple level security levels in a mobile telecommunications device, in accordance with the invention.
Figure 2:
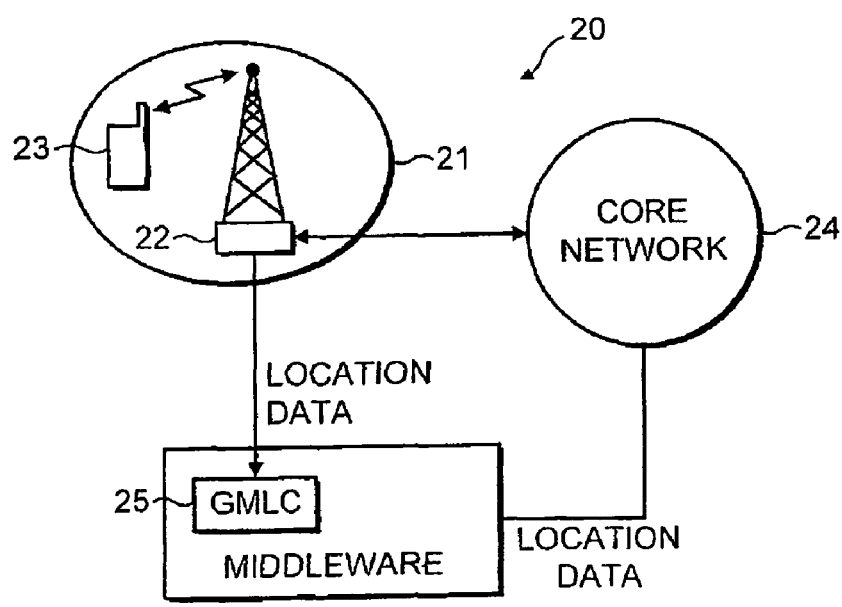
FIG. 2 is a schematic of a first embodiment of a mobile telecommunications device in use within a communications network, in accordance with the invention.

Turning to FIG. 2, there is shown an arrangement in which a cellular telecommunications system 20 provides coverage areas within cells 21 (for clarity, only a single cell is shown in its entirety). Each radio coverage area is served by a base station 22. It should be appreciated that one cell may include more than one base station, and that each base station apparatus or site may also serve or define more than one cell. The shape and size of the cells 21 depend on the particular implementation and can also vary from cell to cell within a single network. It should be appreciated that in some systems the base station may be referred to as Node B.

User equipment (UE) 23 is also shown, taking the form, in of a mobile. It shall be appreciated that typically a number of UEs will be in simultaneous communication with each base station, although for the sake of clarity only a single MS 23 is shown in this case. Each base station 22 is arranged to transmit signals to and receive signals from the MS 23 via a wireless interface, as is well understood by those skilled in the art. Likewise, the MS 23 is able to transmit signals to and receive signals from the base station 22.

The base station 22 is connected to an access network controller such as a radio network controller (RNC) of a UMTS terrestrial radio access network (UTRAN) within the core network 24. The radio network controller may be connected to appropriate core network entities of the cellular system, such as a MSC (mobile switching centre) and/or SGSN (serving general packet radio service support node), via a suitable interface arrangement. These, however, do not form an essential element of the invention and are thus not explained in any greater detail.

The location of the MS 23 may vary in time as the user equipment is free to move within the coverage area of a base station 22 and also from coverage to coverage area. Modern communication systems are capable of providing information regarding the geographical location of an MS within the coverage area of the network(s) within which they are operating. The geographical location may be defined on the basis of the position of the mobile station relative to the base station(s) of the mobile telecommunications network. The geographical location of the user equipment may also be defined, for example, in X and Y co-ordinates or in latitudes and longitudes. It is also possible to define the location of the base stations and/or mobile stations in vertical directions.

In FIG. 2, location service (LCS) functionality of the communication system is provided by a Gateway Mobile Location Center (GMLC) entity 25. The GMLC gathers via appropriate interface means information concerning the location of the MS 23 from the cellular system.

The cellular system may be provided with various different means for processing information gathered from the cells and/or some other parameters and/or for computing by processor means appropriate calculations for determining and outputting the geographical location of the target user equipment.

The LCS 25 may thus be configured to provide, on request or periodically, the current or most recent geographic location of the target user equipment or, if the location fails, an error indication and optionally the reason for the failure. A more detailed description of a LCS entity that may be employed in the embodiments of the present invention can be found e.g. from the above referenced 3GPP technical specification No. 3GPP TS23.271.

It will be appreciated that the LCS server will usually be supported by other middleware such as one or more servers (not shown).

In use, the user of MS 23 is free to move around within the network 20, including from cell to cell 21. The user's location is periodically updated via the GMLC.

In the preferred form, the user of MS 23 is able to define locations that are considered relatively safe. So, for example, a user might define the areas adjacent his or her home and workplace as being relatively safe, and everywhere else as being relatively unsafe. The resolution of these areas is limited by the geographical resolution available from the GMLC. In some case, this resolution might simply be the cell 21 defined by the respective base stations closest to the user's home and workplace. In other case, the resolution can be smaller than a single cell, base on, for example, triangulation between multiple base stations or handover data generated when the MS 23 is adjacent two or more cells.

The specific radius might also be set manually by a user, in metres, hundreds of metres or even kilometres from a particular area.

The MS 23 is also capable of operating in at least first and second security modes, the first security mode requiring higher security access than the second. The first security mode can, for example, require a longer password or PIN to be entered to access the MS 23 than the second security mode. In other embodiments, the first security mode can require a more frequent input of security data than the second mode. For example, in the first security mode, it might be necessary to input a PIN or password each time the phone is to be accessed, whilst the second security mode requires less frequent PIN or password access, or even no PIN or password input at all.

Periodically, the location of the MS 23 in relation to the network is established, and the data used to determine which security mode the MS 23 should be placed in.

In one embodiment, this determination takes place within the MS 23 itself, based on location data supplied from the GMLC via the base station 22. In this case, the mobile phone, upon determining that the MS 23 is within a relatively safe area automatically places itself into the second, lower security mode. Once the MS 23 is moved out of the relatively safe area, as determined with reference to the location data, the security mode is automatically switched to the first, higher mode.

Figure 3:
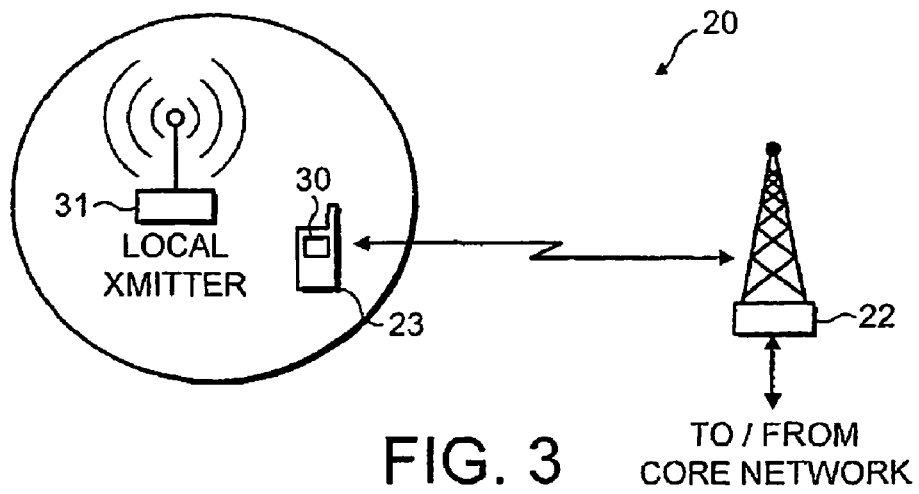
FIG. 3 is a schematic of a second embodiment of a mobile telecommunications device for use within a communications network, in accordance with the invention.

Turning to FIG. 3, there is shown a second embodiment of the invention, in which the MS 23 is equipped with a Bluetooth™ receiver 30 designed to receive signals from a Bluetooth™ transmitter 31. The Bluetooth™ transmitter is a local, low power transmitter designed to transmit an identifying signal within a relatively short range. This could cover, for example, a home or office environment. The Bluetooth™ receiver in the MS 23 is configured to ascertain whether any signal received from a transmitter is a location signal that it recognises. In the event that the signal is recognised, the MS 23 determines that it is located in a relatively safe area and selects the second security mode. The presence of the signal is periodically determined. In the event it is no longer detected, the MS 23 selects the first, higher security mode on the basis that it is no longer in an area perceived as safe.

It will be appreciated that the selection of a Bluetooth™ local communication system is exemplary only, and that any suitable signal, of any scale, can be used to determine a safe area. For example, local radio station signals can be selected as enabling signals, such that the MS 23 is in the first security mode when the signal is present and in the second mode when the signal is absent.

Figure 4:
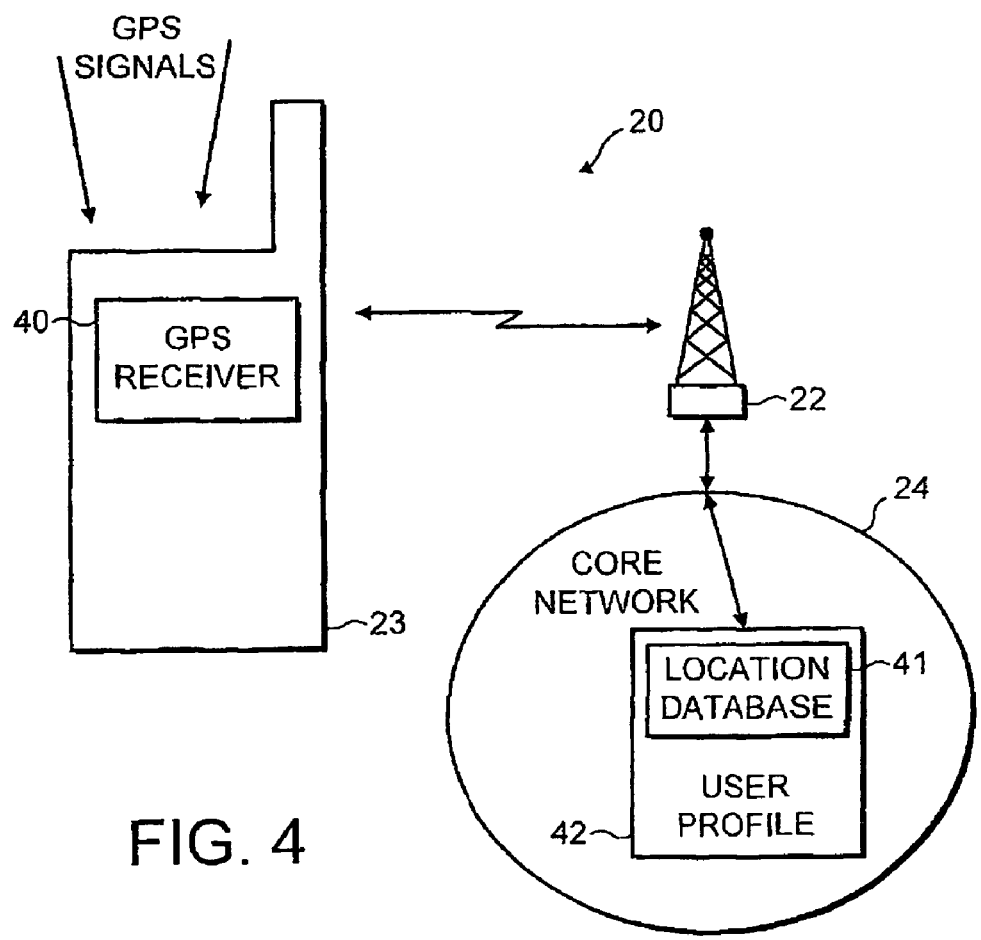
FIG. 4 is a schematic of a third embodiment mobile telecommunications device in use within a communications network, in accordance with the invention.

Turning to FIG. 4, there is shown yet another embodiment in which the location is determined by Global Positioning System (GPS) data. The operation of GPS is well known and so will not be described in detail here.

In general terms, by comparing time delays in signals from a number of different geosynchronous satellites, it is possible to compute the location of the MS 23 with considerable accuracy. In this case, the MS 23 is capable of determining its own location by means of an inbuilt GPS receiver 40 and then ascertaining which security mode it should enter. This can be done with reference to a look up table 41 of safe (or, less likely, unsafe) areas or locations. In the illustrated form, this table 41 is stored as part of the subscriber's profile data 42 stored within the network. Alternatively, a similar table can be stored in the MS 23 itself.

Although the invention has been described in relation to two security modes, it will be appreciated that it can be expanded to cover any number of security modes. For example, a low security mode can be defined for use in the home, a medium security for use in the workplace and high security elsewhere. Also, multiple different locations can share the same security setting.

It will also be understood that the security mode can be decided entirely within the network on the basis of the user's definitions of locations or areas, and the security mode selected automatically based on an instructions sent to the MS 23 from the network. For example, the network may define certain areas as dangerous for mobile phone theft, and transmit an instruction to all mobile devices within that area to enter a relatively high security mode if they have the capability. In other embodiments, the user can optionally configure the MS 23 to ignore such commands, or to give a warning that the area is considered unsafe without actually entering a different security mode.

In the preferred form, the invention requires the user to periodically enter identification to ensure the MS 23 does not enter a locked mode that is relatively difficult to unlock.

The actual ways in which users authenticate themselves are not important to the operation of the invention. Whilst passwords and PINs have been described above, biometrics such as heart rate, fingerprint or retinal scanning or voice analysis can also be used to identify the user in one or more of the selectable security modes. In yet other embodiments, smart cards, swipe cards or other data bearing media can be used to unlock the MS 23.

It will be appreciated that in yet other embodiments, allowing the MS 23 to go into sleep mode due to a failure of the user to undertake the required authentication steps can require network intervention to unlock the MS 23.

Although the invention has been described with reference to a specific examples, it will be appreciated that the invention can be embodied in many other forms.

The invention claimed is:

1. A method, comprising:
   receiving, in a mobile device, input indicative of a geographical range and a security level associated with the geographical range;
   periodically determining a location of a mobile device and comparing said determined location with said geographical range;
   automatically selecting one of a plurality of security levels in response to each comparison of the determined location with the geographical range, where the selected security level is the security level associated with the geographical range when the determined location is within the geographical range; and implementing a security procedure within the mobile device on the basis of the selected security level, wherein each of the plurality of security levels defines security procedures implemented when the security level is selected which require the input of security data by a user in order to access services on the device, and wherein a first security level requires more frequent input of the same security data by the user than a second security level to prevent the mobile device entering a higher security level.

2. A method according to claim 1, wherein the location is defined as an area.

3. A method according to claim 1, wherein the geographical range is defined in relation to the location.

4. A method according to claim 3, wherein the location of the mobile device is determined by a telecommunications network.

5. A method according to claim 1, wherein the location is defined in terms of a cell defined in a telecommunications network.

6. A method according to claim 1, wherein the location is defined in terms of proximity to one or more base stations within a telecommunications network.

7. A method according to claim 1, wherein the location is determined by the mobile device.

8. A method according to claim 7, wherein determining the location of the mobile device comprises:

receiving a signal at the mobile device;

ascertaining whether the signal is indicative of the device being within a relatively safe area; and if the device is within a relatively safe area, implementing the relatively lower of the security levels within the mobile device.

9. A method according to claim 8, wherein the signal is a relatively short-range signal compared to call or data signals transmitted and received between the mobile device and a network.

10. A method according to claim 8, wherein the signal includes unique data identifying a transmitter from which it is transmitted, thereby enabling the mobile device to ascertain whether it is in a location defined by proximity to the transmitter.

11. A method according to claim 7, wherein the location is determined by reference to one or more external location providing signals.

12. A method according to claim 11, wherein the external location providing signals are global positioning system signals, the mobile device being configured to ascertain the location of the mobile device based on the global positioning system signals.

13. A method according to claim 1, wherein the geographical range is defined in terms of a radius of operation with respect to the location.

14. A method according to claim 1, wherein the first security level is higher than the second security level.

15. A method according to claim 1, further comprising: in response to not receiving input of the security data at a frequency required by the selected security level, selecting a higher security level than the selected security level.

16. A method according to claim 1, further comprising giving a warning that the determined location is considered unsafe.

17. An apparatus, comprising:

a receiver configured to receive input indicative of a geographical range and a security level associated with the geographical range;

a comparator configured to periodically determine a location of the apparatus and compare said determined location with said geographical range;

a selector configured to automatically select one of a plurality of security level of a mobile device in response to each comparison of the determined location with the geographical range, where the selected security level is the security level associated with the geographical range when the determined location is within the geographical range; and an implementer configured to implement a security procedure based on the selected security level, wherein each of the plurality of security levels define a security procedure to be implemented when the security level is selected which require the input of security data by a user in order to access services on the device, and wherein a first security level requires more frequent input of the same security data by a user than a second security level to prevent the mobile device entering a third security level.

18. An apparatus according to claim 17, wherein the location is defined as an area.

19. An apparatus according to claim 17, wherein the location of the mobile device is determined by a telecommunications network.

20. An apparatus according to claim 17, wherein the location is defined in terms of a cell defined in a telecommunications network.

21. An apparatus according to claim 17, wherein the location is defined in terms of proximity to one or more base stations within a telecommunications network.

22. An apparatus according to claim 17, wherein the location is determined by the mobile device.

23. An apparatus according to claim 22, wherein the comparator is further configured to:

receive a signal at the apparatus;

ascertain whether the received signal is indicative of the device being within a relatively safe area; and if the apparatus is within a relatively safe are, implementing a relatively lower of the security levels within the apparatus.

24. An apparatus according to claim 23, wherein the signal is a relatively short-range signal compared to call or data signals transmitted and received between the mobile device and the network.

25. An apparatus according to claim 23, wherein the signal includes unique data identifying a transmitter from which it is transmitted, thereby enabling the apparatus to ascertain whether it is in a location defined by proximity to the transmitter.

26. An apparatus according to claim 22, wherein the location is determined by reference to one or more external location providing signals.

27. An apparatus according to claim 22, wherein the external location providing signals are global positioning system signals, the apparatus being configured to ascertain its the location of the apparatus based on the global positioning system signals.

28. An apparatus according to claim 17, wherein the geographical range is defined in terms of a radius of operation with respect to the location.

29. An apparatus according to claim 17, wherein the first security level is higher than the second security level.

30. An apparatus according to claim 17, wherein the security data comprises at least one of: identification data, a personal identification number, a password and biometric data.

31. An apparatus according to claim 17, wherein the selector is further configured, in response to not receiving input of the security data at a frequency required by the selected security level, to select a higher security level than the selected security level.

32. An apparatus, comprising:
receiving means for receiving input indicative of a geographical range and a security level associated with the geographical range;
determining means for determining a location of the apparatus and comparing said determined location with said geographical range;
selecting means for automatically selecting one of a plurality of security levels of a mobile device in response to each comparison of the determined location with the geographical range, where the selected security level is the security level associated with the geographical range when the determined location is within the geographical range; and
implementing means for implementing a security procedure based on the selected security level,
wherein each of the plurality of security levels defines a security procedure to be implemented when the security level is selected which require the input of security data by a user in order to access services on the device, and
wherein a first security level requires more frequent input of the same security data by a user than a second security level to prevent the mobile device entering a third security level.

* * * * *

UNITED STATES PATENT AND TRADEMARK OFFICE
CERTIFICATE OF CORRECTION

| | | |
|---|---|---|
| PATENT NO. | : 7,835,721 B2 | |
| APPLICATION NO. | : 10/508054 | |
| DATED | : November 16, 2010 | |
| INVENTOR(S) | : Tuulos et al. | |

It is certified that error appears in the above-identified patent and that said Letters Patent is hereby corrected as shown below:

Claim 27, col. 8, line 60 delete "its" in between ascertain and the.

Signed and Sealed this
Fourth Day of January, 2011

David J. Kappos
*Director of the United States Patent and Trademark Office*